Oct. 19, 1965  A. C. SANFORD  3,212,694
APPARATUS FOR FABRICATING WOODEN STRUCTURES
Filed Nov. 26, 1962  9 Sheets-Sheet 7

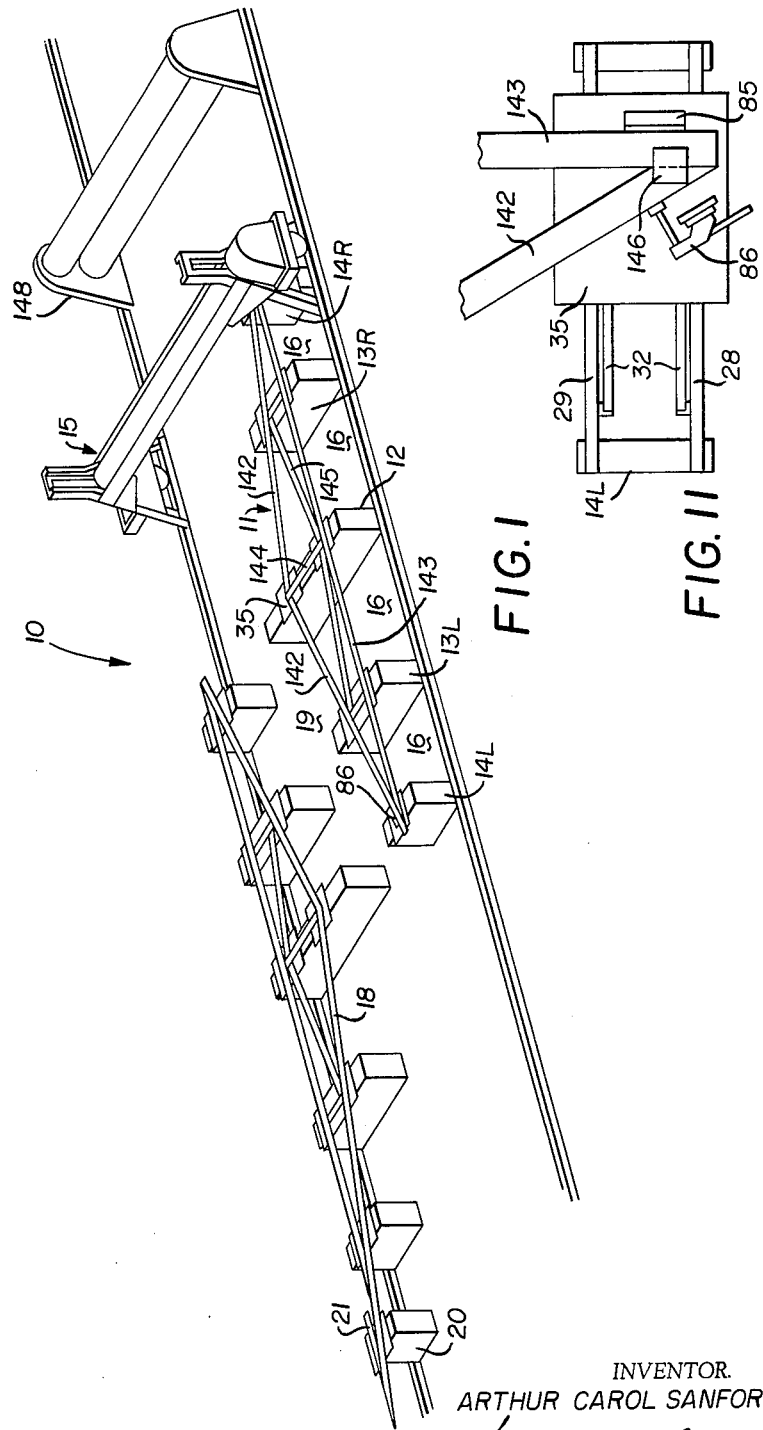

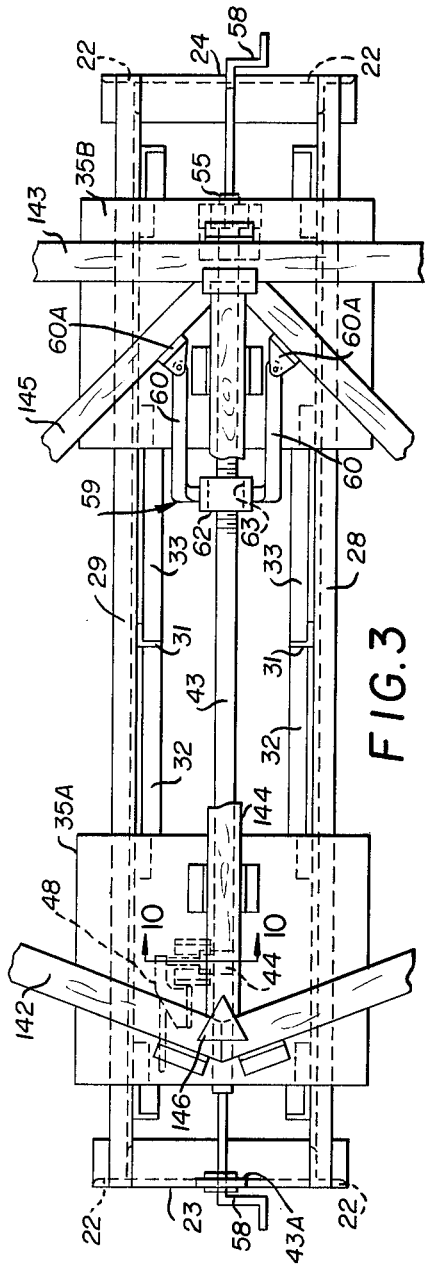

INVENTOR.
ARTHUR CAROL SANFORD
BY Hamilton & Cook
ATTORNEYS

Oct. 19, 1965  A. C. SANFORD  3,212,694
APPARATUS FOR FABRICATING WOODEN STRUCTURES
Filed Nov. 26, 1962  9 Sheets-Sheet 8

INVENTOR.
ARTHUR CAROL SANFORD
BY Hamilton & Cook
ATTORNEYS

Oct. 19, 1965   A. C. SANFORD   3,212,694
APPARATUS FOR FABRICATING WOODEN STRUCTURES
Filed Nov. 26, 1962   9 Sheets-Sheet 9

INVENTOR.
ARTHUR CAROL SANFORD
BY Hamilton + Cook
ATTORNEYS

United States Patent Office 3,212,694
Patented Oct. 19, 1965

3,212,694
APPARATUS FOR FABRICATING WOODEN
STRUCTURES
Arthur Carol Sanford, Fort Lauderdale, Fla., assignor to
Sanford Industries, Inc., Pompano Beach, Fla., a corporation of Florida
Filed Nov. 26, 1962, Ser. No. 239,986
12 Claims. (Cl. 227—152)

The present invention relates generally to the fabrication of wooden structures composed of several parts. More particularly, the present invention relates to apparatus for joining wooden structural members together. Specifically, the present invention relates to apparatus for fabricating wooden structures by the use of metallic connector plates.

The development of improved connector plates has provided a means for prefabricating lightweight and inexpensive trusses and other structural assemblies from dimensional lumber. The connector plates themselves are metallic sheets, of approximately 20-24 gauge, from which are punched a multiplicity of closely spaced pointed projections. These projections preferably extend outwardly from only one face of the plate but may extend outwardly from both faces. When the projections, or teeth, extend outwardly from only one face the plate is an "exterior" plate and is especially suited for connecting butted joints. When the teeth extend outwardly from both faces the plate is a "sandwich" plate and is especially suited for connecting lapped joints. The concept of the present invention is equally applicable for fabricating structures with lapped as well as butt joints, but will only be described in detail in conjunction with the fabrication of butt joint trusses, as that will impart a complete understanding of the concept of the present invention.

Exterior connector plates are applied to the sides of joints between the various members of the structure and the teeth forced into the wood. The load stress at each joint is thusly distributed over a relatively large area, i.e., the area of the connector plate. Moreover, the teeth are spaced sufficiently apart and so shaped as to be inserted as much interfibrously as possible with very little fiber destruction. When used in the construction of, for example, a truss, this increased strength at the joint permits increasing the allowable span and lowering the allowable pitch.

Considerably more pressure is required to apply the connector plate to the structure than can be readily exerted by a man with a hammer. Consequently, heretofore the assemblymen would lay out a structure such as a truss on the work table and place a connector plate over each joint. These plates were then tacked into position by driving a plurality of nails through nail holes provided in the plate. These nails were required not only to hold the plate in position until it was fully set but were also required to retain the truss members in abutting position until the last step of the fabrication. When all the connector plates were thus applied to one side of the truss, the truss was turned over and the process repeated. The partially constructed truss was then passed through a roller press or the joints were successively placed beneath a hammer press to drive the teeth fully into the wood. This method, however, is arduous, inefficiently time consuming and expensive.

It is therefore an object of the present invention to provide apparatus for the quick and inexpensive fabrication of wooden structures with connector plates.

It is another object of the present invention to provide apparatus for the fabrication of wooden structures with connector plates without initially tacking the plates in position with nails.

It is a further object of the present invention to provide apparatus for the fabrication of wooden structures with exterior connector plates in which the plates can be applied to both sides of the structure without inverting the structure.

It is a still further object of the present invention to provide apparatus for the fabrication of wooden structures having varied span and pitch with connector plates.

These and other objects which will become apparent from the following specification are accomplished by means hereinafter described and claimed.

One preferred embodiment of the present invention is shown by way of example in the accompanying drawings and described in detail without attempting to show all of the various modifications in which the invention might be embodied; the invention being measured by the appended claims and not by the details of the specification.

In the drawings:

FIG. 1 is a perspective view of an apparatus according to the present invention adapted for fabrication of wooden trusses;

FIG. 2 is a side elevation, partly broken away, of a main supporting station;

FIG. 3 is a top plan view of the supporting station depicted in FIG. 2;

FIG. 11 is a top plan of an end supporting station;

Figure 4:
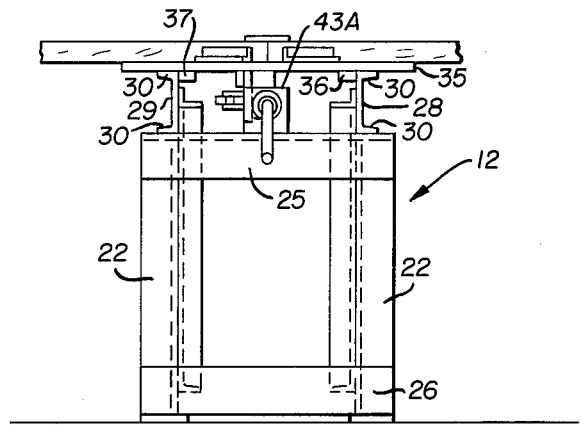
FIG. 4 is an end elevation of the supporting station depicted in FIGS. 2 and 3.

In general, a fabricating machine according to the present invention comprises a plurality of longitudinally spaced, laterally extending supporting stations aligned with a gantry roller press movable along and above the spaced series of supporting stations. Each joint of the structure must rest upon a reaction pad which is sufficiently strong to withstand the pressures applied by the gantry roller against the structural members and connector plates initially to set the teeth of the connector plates as the gantry roller moves along and above the supporting stations. In order to accommodate assemblies of various sizes and configurations, the supporting stations are preferably movable toward and away from each other.

Moreover, the use of a plurality of supporting stations provides a work bay adjacent each station which permits the assemblymen to lay out the components of the structure on and across the series of spaced supporting stations. In doing so, the assemblymen also properly position the connector plates on both sides of, or between, the structural members at the joints. Jig and clamping means are provided to assure uniformity of assembly and to maintain the components of the structure in position until the teeth of the connector plates have been initially set by the gantry press.

When thus preliminarily assembled, a gantry press carried on track means is passed across the structure so that the roller of the gantry press applies pressure downwardly against the components supported on the reaction pads of the supporting stations to drive the teeth of the connector plates into the assembled wooden members at least far enough to tie them together—i.e., the teeth are set. After this initial setting of the connector plates the teeth are fully seated by passing the structure through a final roller or stamping press.

If desired, additional supporting stations in addition to the number required to assemble a single structure, can be aligned with the gantry press to assemble one or more additional structures. In the drawings, the fabricating machine according to the present invention is indicated generally by the numeral 10. A truss 11 is depicted in assembly position and is of such size and configuration as to require a central or main supporting station 12, two intermediate supporting stations 13R and 13L and two end supporting stations 14R and 14L which are aligned with gantry press 15 and spaced apart from each other to provide work bays 16 therebetween and to support the truss at all joints. In the embodiment shown, the supporting stations are of various lateral dimension with respect to their longitudinal alignment with the gantry press. The use of such "stepped" dimension supporting stations permits assembly of successive trusses, such as 18, independently of the prior or succeeding truss dimensions. These additional mirrored arrangements of supporting stations used to fabricate successive trusses 18 can be aligned with a single gantry press 15 and so arranged as to provide a walkway 19 therebetween. If desired, any of the series of supporting stations may include an additional station 20 termed a soffit return station to support a soffit return member 21, if one is desired.

Each supporting station, whether main, intermediate or end, is constructed generally in the fashion of a bench. As shown in FIGS. 2-4, the main supporting station 12 has two vertical legs 22 at each end 23 and 24 of the bench-like structure which are firmly interconnected by an upper brace 25 and lower brace 26. A pair of spanning members 28 and 29 are supported between ends 23 and 24. These members 28 and 29 are preferably spaced apart, parallel channels with oppositely, outwardly directed legs 30. Each channel spanning member 28 and 29 is trussed, as, for example, by inverted kingpost 31 and chord members 32 and 33 to keep the reaction vertical and to increase the effective beam depth of the individual spanning members 28 and 29 to withstand the pressures exerted by the gantry press 15 during the assembly operation, as will be hereinafter more fully explained.

Figure 5:
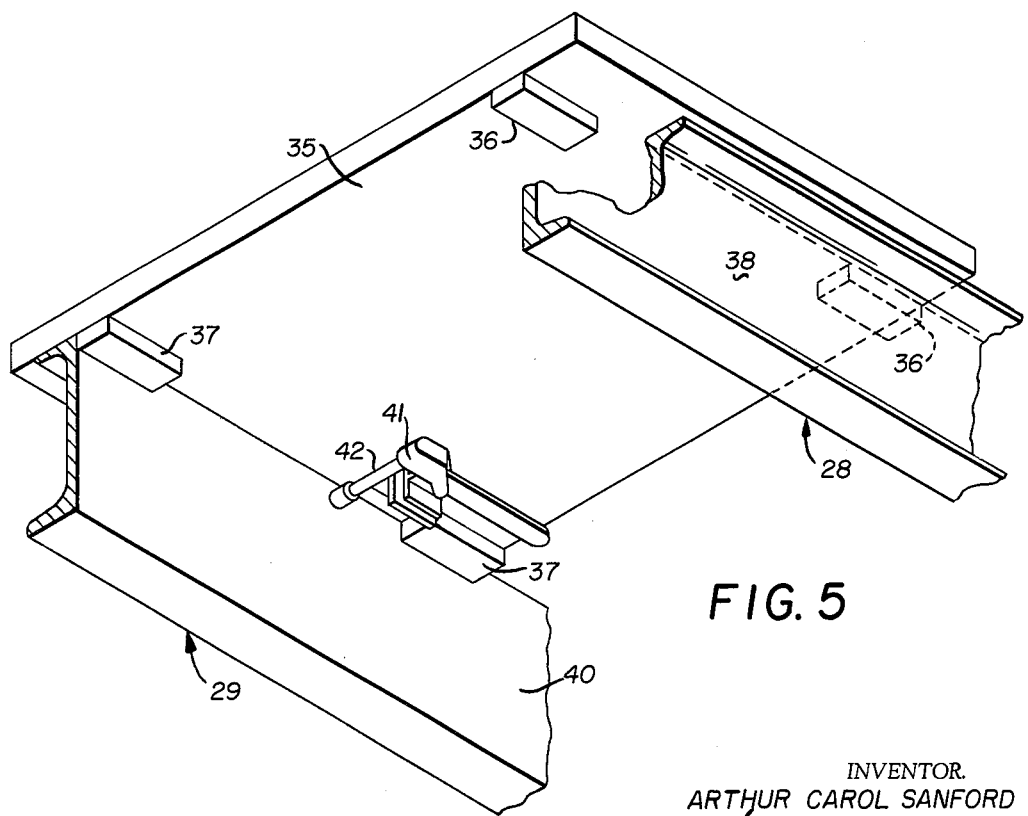
FIG. 5 is a perspective view of a reaction pad from beneath depicting its connection to the frame of a supporting station.

One or more preferably rigid metallic reaction pads 35 are carried on and between the uppermost portion of the spanning members 28 and 29. While the reaction pad may extend the full dimension of the spanning members, such is not necessary as it has been found sufficient to use a pad 35 slightly larger than the joint area—i.e., the connector plate area—of the trusses to be fabricated. Adjustable positioning of these efficiently sized reaction pads 35 can be accomplished by the provision of guides 36 (see FIG. 5) on the underside thereof which slidably engage the web 38 of channel-spanning member 28 and similar guides 37 for engaging the web 40 of channel member 29.

A clamp 41 is also mounted on the underside of the reaction pad 35. As shown, the pressure rod 42 of a single jaw toggle clamp 41 is forced against the web 40 of the channel member 29. This pressure forces the guides 36 into solid abutting relationship against web 38 of channel member 28 to lock the reaction pad 35 in the selected position. Single jaw toggle clamp 41 may be of the well-known type depicted in FIG. 6 and described in detail in conjunction with the description thereof.

Figure 10:
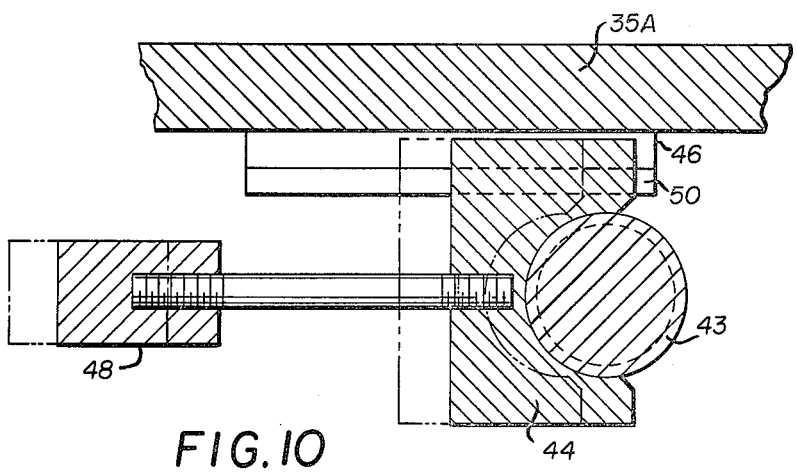
FIG. 10 is a cross section taken substantially on line 10—10 of FIG. 3.

This clamping and adjusting arrangement can be used satisfactorily on all the supporting stations. However, an alternative form may also be used with equal facility. The main, or central, supporting station 12, as is best seen in FIGS. 2-4, has a reaction pad 35A mounted thereon in conjunction with the threaded shaft 43, one end which is selectively engageable by a cooperatively threaded half nut 44 mounted on the underside of the reaction pad 35. The half nut 44 (see also FIG. 10) is controllably slidable into and out of engagement with threaded shaft 43 along flanged guides 45 and 46 by the operation of a positioning and locking means, such as the single jaw tight toggle clamp 48, of the kind hereinafter more fully described in conjunction with the description pertaining to FIG. 6. The flanged guides are secured to the underside of reaction pad 35A parallel to each other and perpendicularly to shaft 43 with their respective guide legs 49 and 50 extending toward each other in an opposed relationship. The guide legs 49 and 50 slidably engage respective guide slots 51 and 52 of the outer surface of the half nut 44.

The forward end of shaft 43 is journaled in a bearing 53 attached to the underside of the second reaction pad 35B on the main supporting station 12, and the opposite end is journaled in the frame of the support station, as at 43A. In the embodiment shown, the threaded shaft 43 is prevented from moving axially with respect to the second reaction pad 35B by forming that portion of the shaft journaled in bearing 53 in such a way that it is not threaded and has a reduced diameter. The reduction in diameter provides a shoulder 54 which slidably engages one surface of the bearing 53. Cooperating with shoulder 54 and on the opposite side of bearing 53, is a collar 55 secured to the reduced portion 56 of the shaft 43. The shoulder 54 and collar 55 restrict the shaft 43 from axial movement.

Crank handles such as 58, may be attached to either or both ends of shaft 43 to provide a means for manual rotation of shaft 43.

A clamp yoke, indicated generally by the numeral 59, is mounted on the shaft 43 between reaction pads 35A and 35B. Two clamp arms 60 extend forwardly from the base 62 of the yoke 59. The pivotal shoes 60A, as are all the members which angularly engage the wooden components, are preferably burred to assure locking engagement with the structural components of the truss.

A nut 63 is nonrotatably mounted in base 62 and engages the threaded shaft 43 to support and control the movements of yoke 59.

Figure 6:
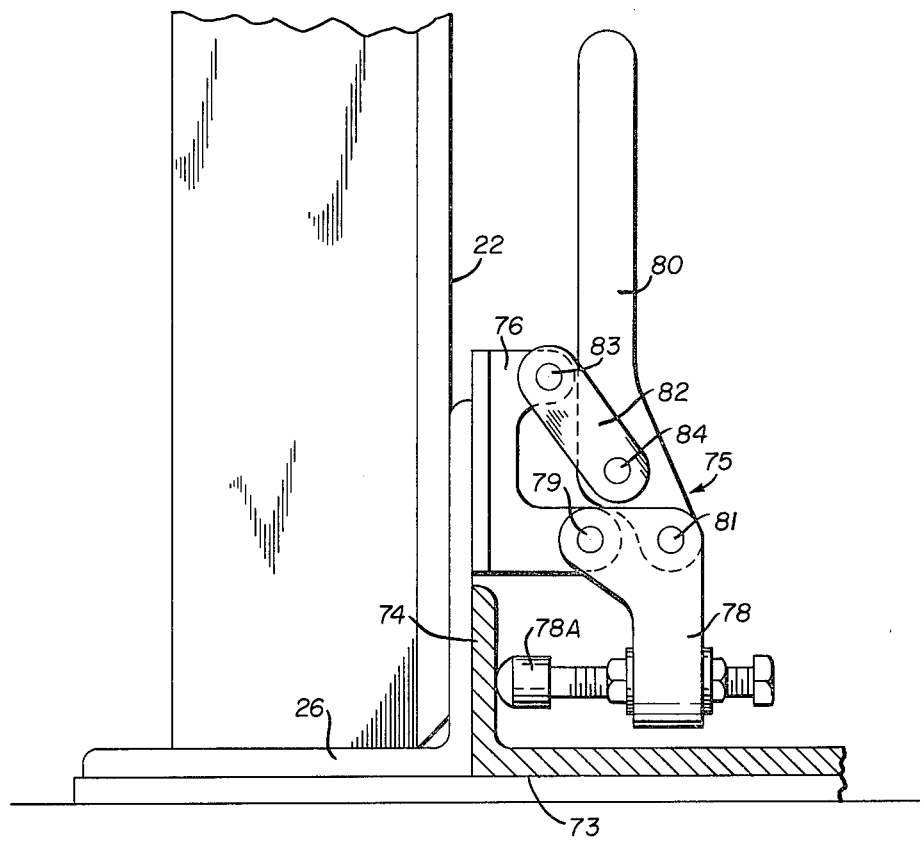
FIG. 6 is an enlarged area of FIG. 2 depicting a single saw toggle clamp in side elevation.
Figure 7:
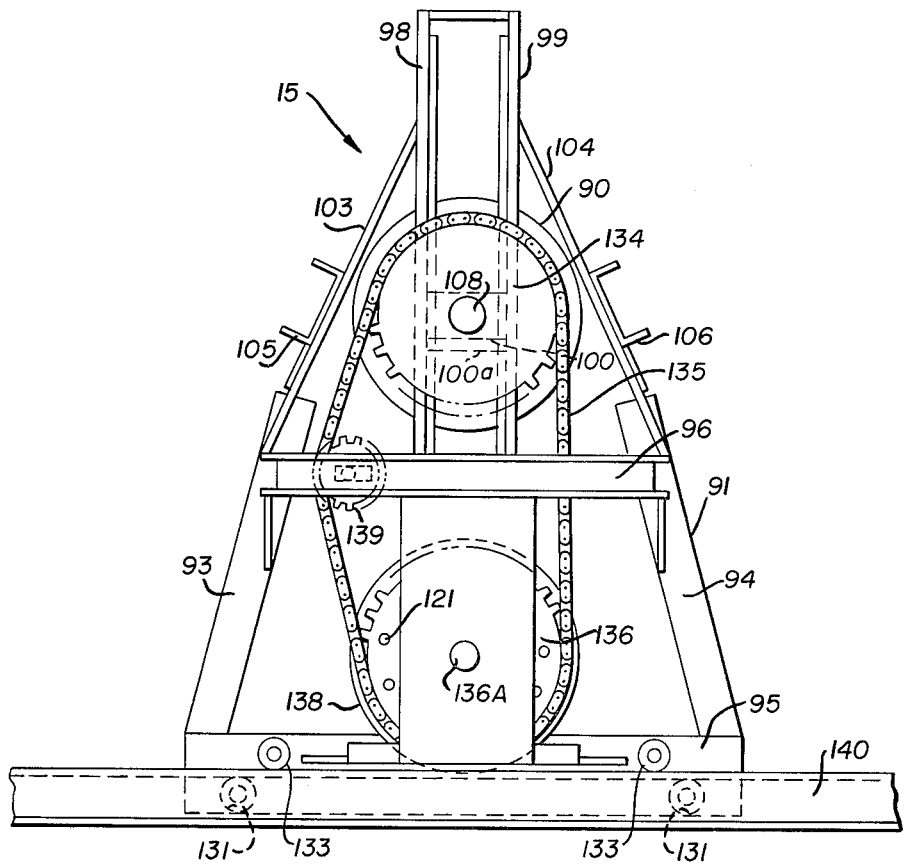
FIG. 7 is an end elevation of a gantry press taken substantially on line 7—7 of FIG. 8.
Figure 8:
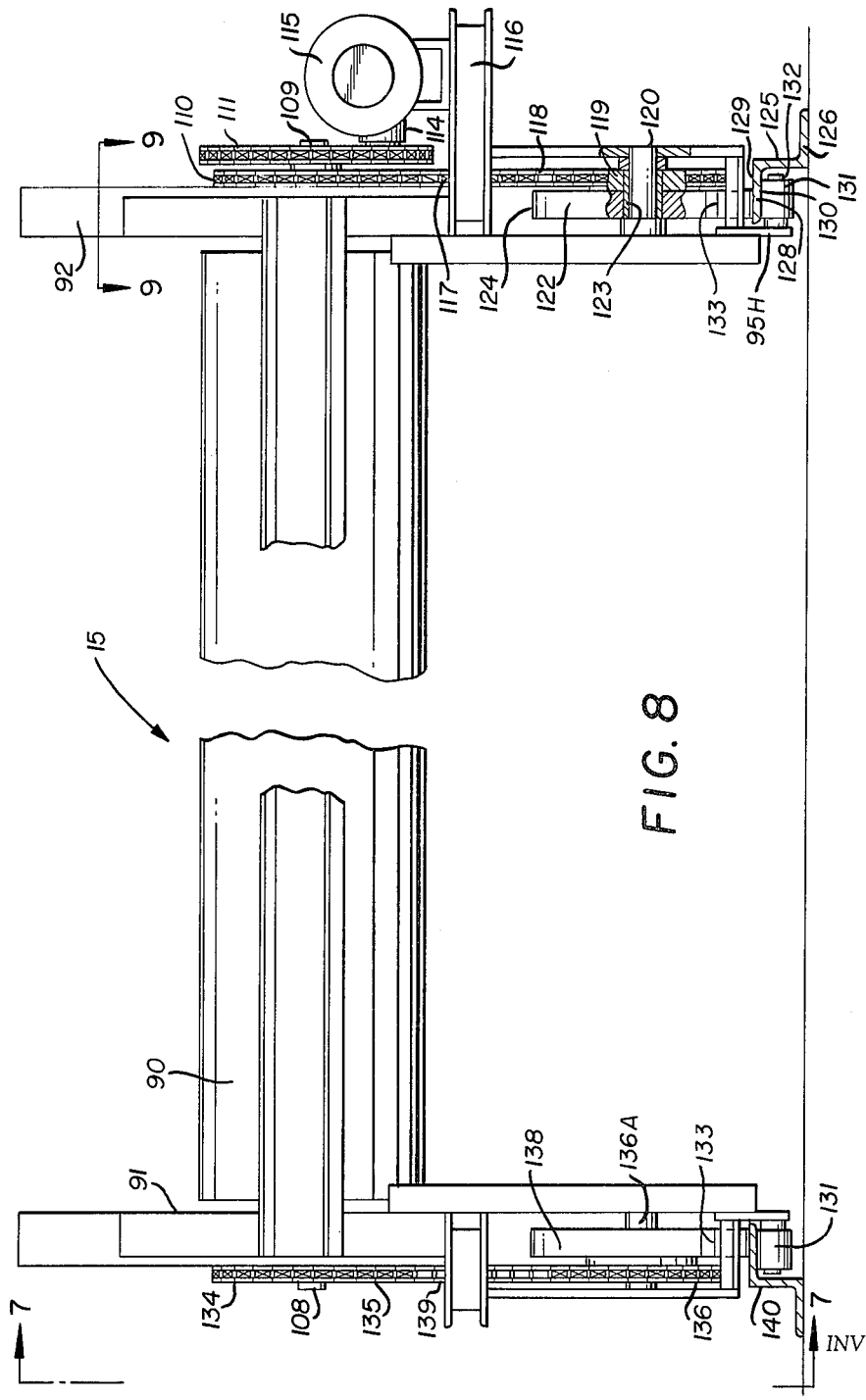
FIG. 8 is a frontal elevation of a gantry press.
Figure 9:
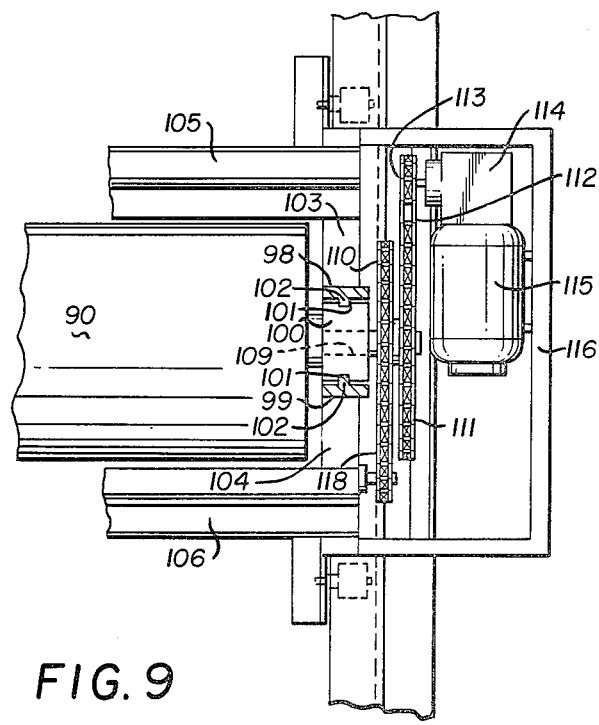
FIG. 9 is a cross section taken substantially on line 9—9 of FIG. 8.
Figure 12:
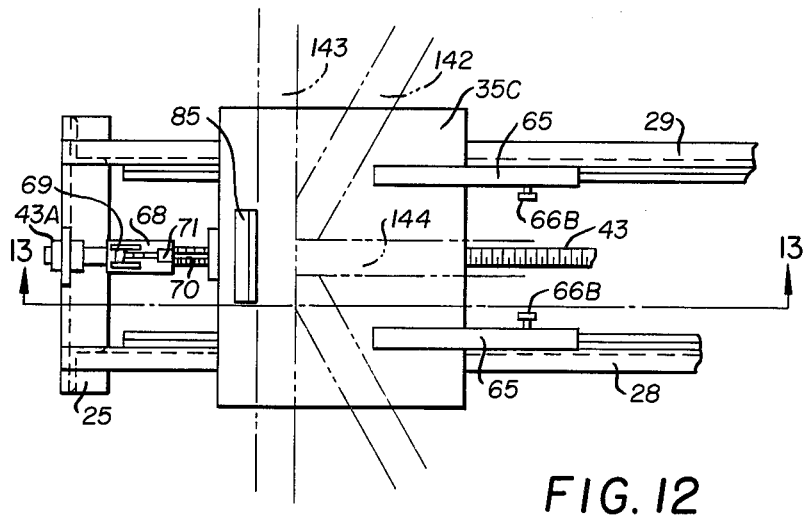
FIG. 12 is a top plan of a portion of an alternative form of a main supporting station.
Figure 13:
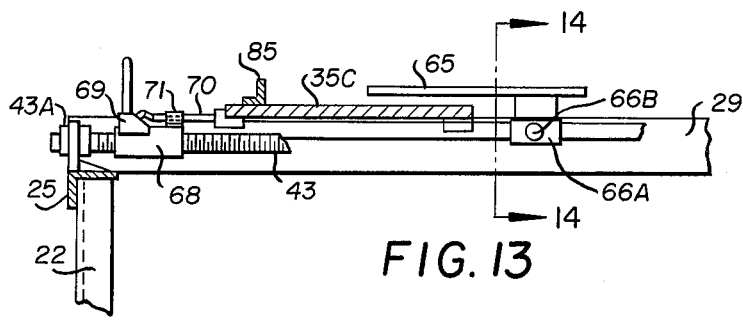
FIG. 13 is a cross section taken substantially on line 13—13 of FIG. 12.
Figure 14:
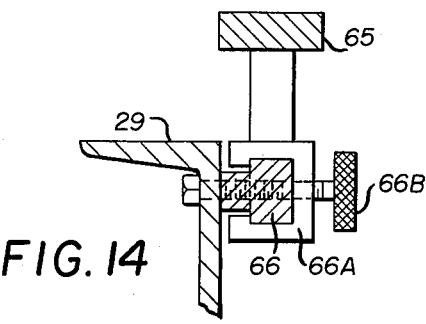
FIG. 14 is an enlarged cross section taken substantially on line 14—14 of FIG. 13.
Figure 15:
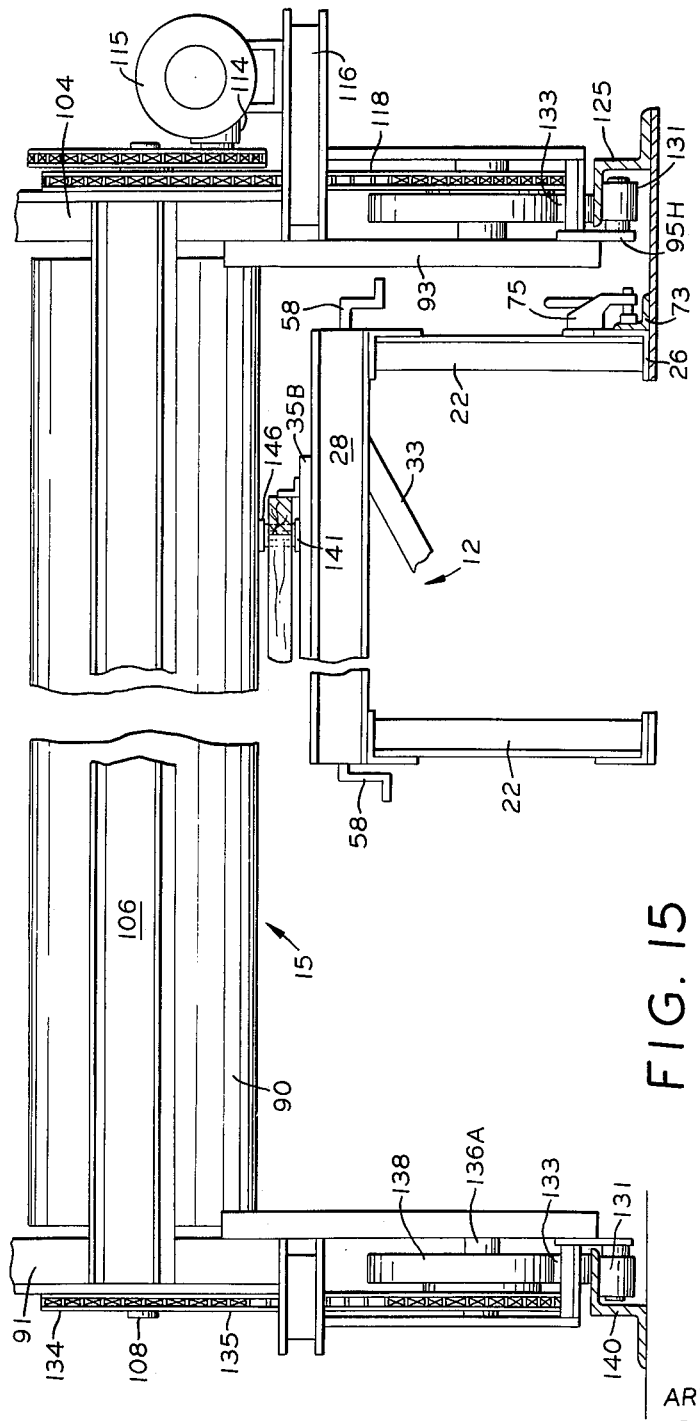
FIG. 15 is a side elevation of the gantry press depicted in operative position over one of the support stations; and, FIG. 16 is an enlarged area of FIG. 13 showing the clamp schematically depicted therein in greater detail.
Figure 16:
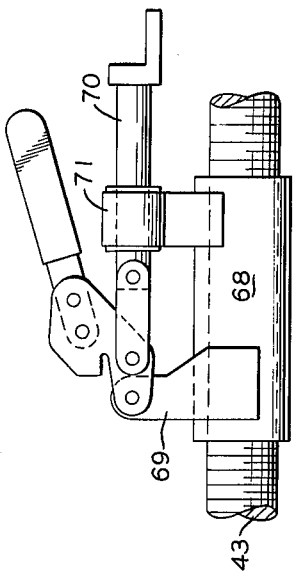

A modification of this reaction pad adjustment arrangement is shown in FIGS. 12-14. In that arrangement individual clamp arms 65 are adjustably positionable along the spanning members 28 and 29 of supporting station 12, as by the T shaped bar 66 connected to the web of the spanning members. A C-shaped member 66A encompasses the T-bar 66 and is adjustably locked thereto by the tightening screw 66B. The arms 65 are carried on the C-member 66A. The reaction pad 35C is movable toward and away from the clamp arms to lock the elements carried thereon in position against the clamp arms 65. This is accomplished by sleeve 68 which threadably encompasses the shaft 43 and carries a single arm toggle clamp 69. In this embodiment the shaft 43 is journalled into the frame of the supporting station, as at 43A. The shift bar 70 connected to the reaction pad 35C through the slide bearing 71, also attached to the sleeve 68, is operated by clamp 69 selectively to shift the position of reaction pad 35C between locked and unlocked engagement with the structural members reposing thereon. The clamp 69 is shown in greater detail in FIG. 16 from which it will be readily apparent that it operates according to the same principle as clamp 48, except that the shift bar 70 effects a locking force applied at 90° to that applied by clamp 48, as shown in FIG. 6.

In order to assure maintenance of the supporting stations at a predetermined separation spacing with respect to each other, an anchor means 73 is provided for interconnecting the stations. The anchor 73 is shown as being a structural angle iron placed along the base of the aligned ends 24 of the stations. The upright flange 74 abuts lower brace 26 and may be detachably secured thereto by clamping means 75.

The clamping means 75 may also be of the single jaw toggle type, similar to clamp 41, and having its base 76 secured to the lower brace 26 and the pressure jaw 78A disposed for gripping engagement with the upright flange 74 of the anchor 73. Single jaw toggle clamps are well known and especially desired for their quick clamping and release action. Clamp 75, as shown in FIG. 6, has a pressure jar 78A adjustably mounted for selective axial displacement in the shift block 78. The shift block 78 is swingably carried on the base 76, as by pivot 79. The shift block 78 is also pivotally connected to handle 80, as at 81.

The quick lock and release is affected by the location of the link, or toggle 82, and the alignment of its pivotal connections 83 and 84 between the base 76 and handle 80, respectively, with the pivotal connection 81 of the handle 80 to the shift block 78.

By thus clamping the individual supporting stations to anchor 73 the spacing therebetween remains constant. Furthermore, the positioning of the anchor means 73 at the floor level places it as much out of the way of the assemblymen as possible and permits the anchor 73 to be connected to the floor, by suitable means not shown, to prevent undesired movement of the joined supporting stations relative to the gantry press 15.

With the supporting stations at least fixed with respect to each other it should be understood that the placement of the jig stops 85 and the appropriate location of the jig clamp means 86 (see FIG. 11) will assure uniformity of the trusses fabricated thereon.

The gantry press 15 mounts a press roller 90 between two dollies 91 and 92. Dollies 91 and 92 have a modified A-frame appearance. Each dolly has upwardly convergent lower side members 93 and 94 with a base brace 95 between the lower extremities of the lower side members 93 and 94 and an upper brace 96 between the upper extremities of side members 93 and 94. Extending upwardly from the upper brace 96 are a pair of spaced apart, parallel members 98 and 99 forming an upwardly directed U-shaped bearing stirrup for floatingly mounting a bearing block 100. Two edges of the bearing block 100 are provided with a groove 101 to receive opposed and facing vertically disposed bar guides 102 in the opposed and facing sides of the stirrup to limit the floating bearing block 100 to vertical movement. A stop block 100A is selectively positionable within the stirrup, as by set screws not shown, to support the roller 90 at the desired height.

Upwardly convergent upper side members 103 and 104 bracingly join the upper extremities of the stirrup to upper brace 96 in proximity to its junction with the lower side members 93 and 94, respectively.

The two dollies 91 and 92 are rigidly interconnected by transverse bracing, such as the two channels 105 and 106 fixed between the corresponding upper side members 93 and 94 of dollies 91 and 92.

The stub shafts 108 and 109 which extend outwardly from the axial ends of the roller 90 are journaled in bearing blocks 100, in dollies 91 and 92, respectively.

The outward extension of stub shaft 109 is non-rotatably keyed to an inner and outer sprocket 110 and 111, respectively. The outer sprocket 111 is driven, as by chain 112, from a drive sprocket 113 connected through a gear reducer 114 to a power means such as electric motor 115 which may be carried on frame extension 116, as shown, or any other convenient location, as, for example, above the roller 90. A chain 118 engages the inner sprocket 110 and runs to wheel sprocket 119 via an adjustable idler sprocket 117. Wheel sprocket 119 is rotatably mounted on a wheel shaft 120 and fastened, as by a plurality of bolts 121, to a drive wheel 122 also rotatably supported on wheel shaft 120. The flanged sleeve bearing 123 is preferably interposed between wheel shaft 120 and the joined wheel 122 and sprocket 119.

The radially outer edge or periphery 124 of wheel 122 drivingly engages a track 125 fastened to the floor by suitable means not shown. Track 125 assists in providing a vertically restrictive means for preventing the gantry press from lifting off the track as it applies downward pressure to the truss assembled across the supporting stations. Specifically, this may be accomplished by a structural H-bar, or a Z-bar track 125, the lower flange 126 of which is secured to the floor. The upper oppositely directed flange 128 is engaged by the drive wheel 122 on the upper surface 129 thereof, and the undersurface 130 of the upper flange 128 is engaged by one or more bogie wheels 131 rotatably carried on a stub shaft 132 extending perpendicularly from the skirt 95H of the base brace 95.

Balance wheels 133 spaced outwardly of the drive wheel 122 and in alignment therewith rotatably engage the upper surface 129 of the upper flange 128 to lend stability to the dolly in a direction parallel to its direction of travel.

Dolly 91 may be constructed similarly to dolly 92 except that no motor or power source need be carried thereon and only a single sprocket 134 need be on non-rotatably mounted on the shaft 108. A chain 135, similar to chain 118 on dolly 92 drivingly connects sprocket 134 to a sprocket 136 attached to the drive wheel 138. An adjustable idler sprocket 139 is also preferably provided for chain 135. Sprocket 136 on wheel 138 is rotatably mounted on shaft 136A for driving engagement of the wheel 138 with its track means 140 in a manner similar to the engagement of wheel 122 to track 125. Balance and bogie wheels 133 and 131, respectively, are also provided on dolly 91.

In constructing the fabricated truss with exterior connector plates by a machine constructed in accordance with the concept of the present invention, the connector plates are placed teeth up in the appropriate predetermined location on each reaction pad 35. The upper and lower chord members 142 and 143, together with the vertical and diagonal bracing members 144 and 145, respectively, are arranged within the jig formed by jig stops 85 and the locking clamps 86. If each connector plate 141 (see FIG. 2) has been properly placed, all the truss joints will be spanned by an appropriate connector plate on the underside of the assembly of truss members and similarly arranged conector plates 146 can be place teeth down on the upper side of the assembly.

Thereafter, the operator actuates the motor 115 which drives the wheels 122 and 138 to move the gantry 15 longitudinally along tracks 125 and 140 toward the aligned supporting stations with the components of truss 11 placed thereon. Because the rotation of the press roller 90 is in the same direction as that of the drive wheels 122 and 138 and further because of the slight slack in drive chains 112, 118 and 135 and the flotation bearings 100 supporting roller 90. it will lift itself slightly to roll on top of the assembled truss components and exert sufficient pressure against the truss components supported on the rigid vertically fixed reaction pads 35 to drive the teeth of the connector plates 141 and 146 into the wooden structural members 142, 143, 144 and 145 sufficiently to maintain the truss in assembled position. After the teeth of the successive connector plates have thus been set by the passage of the gantry press 15 across the entire truss 11, the toggle clamps 86 and pads 35A and 35B are released. It will be noted that the clamps 86 are cooperatively placed in opposition to jig stops 85 to facilitate releasing the truss from the assembly jig.

The truss is then removed from the supporting stations and passed through a fixed press, such as a stationary roller press 148. As the truss passes between the rollers of press 148 the teeth of connector plates 141 and 146 are fully and completely embedded into the truss members.

In constructing a fabricated truss with "sandwich" connector plates the assemblyman would first position those structural components of the truss lying in one plane and then place the "sandwich" plates at the joint locations before positioning the remaining structural components which lie in an adjacent plane. Thereafter, the operation would be identical with that described above.

It should thus be apparent that according to the concept of the present invention a truss can be fabricated quickly and inexpensively by the use of connector plates applied simultaneously on both sides of the joints as the gantry press moves across the truss without preliminary tacking.

What is claimed is:

1. A fabricating machine for setting the teeth of one or more connector plates into the structural members of a wooden structure comprising at least one supporting station and a gantry press, at least one reaction pad on each said supporting station upon which the joint between the structural members can repose, a roller means on said gantry press and means both to move said roller means across and above said reaction pad and to restrict vertical movement of said roller means to apply pressure on the joints between said reaction pad and said roller means sufficient to set the teeth of said connector means into said structural members.

2. A fabricating machine for setting the teeth of one or more connector plates into the structural members of a wooden structure comprising at least one supporting station and a gantry press, at least one reaction pad on each said supporting station upon which the joint between the structural members can repose, a track for guidingly supporting said gantry press, a roller mounted in said gantry press, power means to move said gantry press along said track, movement of said gantry press along said track passing said roller across and above said reaction pad, restrictive means to prevent the gantry press from leaving said track while said roller applies pressure on the joints between said reaction pad and said roller sufficient to set the teeth of said connector means into said structural members.

3. A fabricating machine for setting the teeth of one or more connector plates into the structural members of a wooden structure comprising at least one supporting station and a gantry press, at least one reaction pad on each said supporting station upon which the joint between the structural members can repose, a track for guidingly supporting said gantry press, said gantry press having two dollies, a roller supported between said dollies, a drive wheel on at least one of said dollies operatively engaging said track, power means for rotating said drive wheel to move said gantry press along said track, movement of said gantry press along said track passing said roller across and above said reaction pad, restrictive means to prevent the gantry press from leaving said track while said roller applies pressure on the joints between said reaction pad and said roller sufficient to set the teeth of said connector means into said structural members.

4. A fabricating machine for setting the teeth of one or more connector plates into the structural members of a wooden structure comprising at least one supporting station and a gantry press, at least one reaction pad on each said supporting station upon which the joint between the structural members can repose, jig means for retaining the joint on said reaction pad, a track for guidingly supporting said gantry press, said gantry press having two spaced apart rigidly interconnected dollies, a bearing block in each said dolly, said bearing blocks adapted to float vertically in said dollies, a roller rotatably journaled in and extending between said bearing blocks, a drive wheel on at least one of said dollies operatively engaging said track, power means, means to connect said power means to said drive wheel to move said gantry press along said track and to limit the vertical movement of said roller in said floating bearing blocks, movement of said gantry press along said track passing said roller across and above said reaction pad, restrictive means to prevent the gantry press from leaving said track while said roller applies pressure on the joints between said reaction pad and said roller sufficient to set the teeth of said connector means into said structural members.

5. A fabricating machine for setting the teeth of one or more connector plates into the structural members of a wooden structure comprising at least one supporting station and a gantry press, at least one reaction pad on each said supporting station upon which the joint between the structural members can repose, a track for guidingly supporting said gantry press, said gantry press having two spaced apart rigidly interconnected dollies, a bearing block in each said dolly, said bearing blocks adapted to float vertically in said dollies, a roller rotatably journaled in and extending between said bearing blocks, a drive wheel on at least one of said dollies operatively engaging said track, power means, means to connect said power means to said drive wheel to move said gantry press along said track and to limit the vertical movement of said roller in said floating bearing blocks, movement of said gantry press along said track passing said roller across, and above said reaction pad, restrictive means to prevent the gantry press from leaving said track while said roller applies pressure on the joints between said reaction pad and said roller sufficient to set the teeth of said connector means into said structural members.

6. A fabricating machine for setting the teeth of one or more connector plates into the structural members of a wooden structure comprising at least one supporting station and a gantry press, at least one reaction pad on each said supporting station upon which the joint between the structural members can repose, jig means for retaining the truss joint on said reaction pad, a track, said track having dual rail surfaces, said gantry press having two spaced apart rigidly interconnected dollies, a bearing block in each said dolly, said bearing blocks adapted to float vertically in said dollies, a roller rotatably journaled in and extending between said bearing blocks, a drive wheel on at least one of said dollies operatively engaging one of said rail surfaces, power means, means to connect said power means to said drive wheel to move said gantry press along said track and to limit the vertical movement of said roller in said floating bearing blocks, movement of said gantry press along said track passing said roller across and above said reaction pad, and bogie wheel means on said dollies adapted to engage the second rail surface of said track to prevent the gantry press from leaving said track while said roller applies pressure to the joints between said reaction pad and said roller sufficient to set the teeth of said connector means into said structural members.

7. A fabricating machine for setting the teeth of one or more connector plates into the structural members of a wooden structure comprising at least one supporting station and a gantry press, at least one reaction pad on each said supporting station upon which the joint between the structural members can repose, a track, said track having dual rail surfaces, said gantry press having two spaced apart rigidly interconnected dollies, a roller rotatably journaled in and extending between said dollies, a drive wheel on at least one of said dollies operatively engaging one of said rail surfaces, power means for rotating said drive wheel to move said gantry press along said track, movement of said gantry press along said track passing said roller across and above said reaction pad, and bogie wheel means on said dollies adapted to engage the second rail surface of said track to prevent the gantry press from leaving said track while said roller applies pressure to the joints between said reaction pad and said roller sufficient to set the teeth of said connector means into said structural members.

8. A fabricating machine for setting the teeth of one or more connector plates into the structural members of a wooden structure comprising at least one supporting station and a gantry press, at least one reaction pad on each said supporting station upon which the joint between the structural members can repose, a double track for guidingly supporting said gantry press, said gantry press having two spaced apart rigidly interconnected dollies, a bearing block in each said dolly, said bearing blocks adapted to float vertically in said dollies, a roller rotatably journaled in and extending between said bearing blocks, a drive wheel on each said dolly, each said wheel drivingly engaging its respective track, power means, drive means interconnecting said power means to said wheels and said roller, said drive means limiting the vertical movement of said roller in said floating bearing blocks, movement of said gantry press along said track passing said roller across and above said reaction pad, restrictive means to prevent the gantry press from leaving said track while said roller applies pressure on the joints between said reaction pad and said roller sufficient to set the teeth of said connector means into said structural members.

9. A fabricating machine for setting the teeth of one or more connector plates into the structural members of a wood structure comprising a plurality of longitudinally spaced laterally extending supporting stations aligned with a gantry press, at least one reaction pad on the upper surface of each said supporting station upon which the joints between the structural members carried on and across said supporting station can repose, a track extending past said supporting stations for guidingly supporting said gantry press, a roller mounted on said gantry press, power means to move said gantry press along said track, movement of said gantry press along said track passing said roller across and above the reaction pads on said supporting stations, restrictive means to prevent the gantry press from leaving said track while said roller applies pressure on the joints between said reaction pad and said roller sufficient to set the teeth of said connector means into said structural members.

10. A fabricating machine for setting the teeth of one or more connector plates into the structural members of a wooden structure comprising a plurality of longitudinally spaced laterally extending supporting stations aligned with a gantry press, said supporting stations movable toward and away from each other, and means to lock said supporting stations in fixed spaced relation with each other, at least one reaction pad on the upper surface of each said supporting station upon which the joints between the structural members carried on and across said supporting station can repose, a track extending past said supporting station for guidingly supporting said gantry press, a roller mounted on said gantry press, power means to move said gantry press along said track, movement of said gantry press along said track passing said roller across and above the reaction pads on said supporting stations, restrictive means to prevent the gantry press from leaving said track while said roller applies pressure on the joints between said reaction pad and said roller sufficient to set the teeth of said connector means into said structural members.

11. A fabricating machine for setting the teeth of one or more connector plates into the structural members of a wooden structure comprising a plurality of longitudinally spaced laterally extending supporting stations aligned with a gantry press, said supporting stations movable toward and away from each other and means to lock said supporting stations in fixed spaced relation with each other, at least one reaction pad on the upper surface of each said supporting station upon which the joints between the structural members carried on and across said supporting stations can repose, said reaction pads slidably positionable along the laterally extending supporting stations, the adjustability of said supporting stations with respect to each other and the reaction pads with respect to the supporting stations on which they are mounted permitting the accommodation of structures of various sizes and configurations, a track extending past said supporting stations for guidingly supporting said gantry press, a roller mounted on said gantry press, power means to move said gantry press along said track, movement of said gantry press along said track passing said roller across and above the reaction pads on said supporting stations, restrictive means to prevent the gantry press from leaving said track while said roller applies pressure on the joints between said reaction pads and said roller sufficient to set the teeth of said connector means into said structural members.

12. A fabricating machine for setting the teeth of one or more connector plates into the structural members of a wooden structure comprising a plurality of longitudinally spaced laterally extending supporting stations aligned with a gantry press, said supporting stations movable toward and away from each other and means to lock said supporting stations in fixed spaced relation with each other, at least one reaction pad on the upper surface of each said supporting station upon which the joints between structural members carried on and across said supporting station can repose, a track for guiding the said supporting gantry press, said gantry press having two spaced apart rigidly interconnected dollies, a bearing block in each said dolly, said bearing blocks adapted to float vertically in said dollies, a roller rotatably journaled in and extending between said bearing blocks, a drive wheel on at least one of said dollies operatively engaging said track, power means, means to connect said power means to said drive wheel to move said gantry press along said track and to limit the vertical movement of said roller in said floating bearing blocks, movement of said gantry press along said track passing said roller across and above said reaction pad, restrictive means to prevent the gantry press from leaving said track while said roller applies pressure on the joints between said reaction pad and said roller sufficient to set the teeth of said connector means into said structural members.

References Cited by the Examiner

UNITED STATES PATENTS 3,068,484   12/62   Moehlenpah et al. _____ 1—149

GRANVILLE Y. CUSTER, JR., *Primary Examiner.*